(12) United States Patent
Koike et al.

(10) Patent No.: US 7,569,953 B2
(45) Date of Patent: Aug. 4, 2009

(54) ROTOR FOR HYBRID TYPE STEPPING MOTOR AND MANUFACTURING METHOD THEREOF

(75) Inventors: Akira Koike, Nagano (JP); Ikuo Takeshita, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 224 days.

(21) Appl. No.: 11/300,549

(22) Filed: Dec. 14, 2005

(65) Prior Publication Data

US 2006/0125329 A1   Jun. 15, 2006

(30) Foreign Application Priority Data

Dec. 15, 2004   (JP) .............................. 2004-363391

(51) Int. Cl.
*H02K 37/12* (2006.01)
(52) U.S. Cl. ..................................... 310/49 R; 310/261
(58) Field of Classification Search ............... 310/49 R, 310/43, 261
See application file for complete search history.

(56) References Cited

U.S. PATENT DOCUMENTS

| | | | | | |
|---|---|---|---|---|---|
| 3,293,460 | A | * | 12/1966 | Iwai et al. | 310/49 R |
| 3,694,906 | A | * | 10/1972 | Rank et al. | 29/598 |
| 3,777,196 | A | * | 12/1973 | Field, III | 310/156.64 |
| 4,127,802 | A | * | 11/1978 | Johnson | 318/696 |
| 4,406,958 | A | * | 9/1983 | Palmero et al. | 310/49 R |
| 4,754,183 | A | * | 6/1988 | Gerber | 310/156.08 |
| 5,073,735 | A | * | 12/1991 | Takagi | 310/71 |
| 5,708,310 | A | * | 1/1998 | Sakamoto et al. | 310/49 R |
| 5,723,926 | A | * | 3/1998 | Obara et al. | 310/89 |
| 5,910,335 | A | * | 6/1999 | Yokoyama et al. | 428/800 |
| 5,945,759 | A | * | 8/1999 | Tanaka et al. | 310/90 |
| 6,194,852 | B1 | * | 2/2001 | Lovatt et al. | 318/400.14 |
| 2003/0052552 | A1 | * | 3/2003 | Sakamoto | 310/49 R |
| 2003/0201678 | A1 | * | 10/2003 | Huang et al. | 310/49 R |

FOREIGN PATENT DOCUMENTS

| | | | | |
|---|---|---|---|---|
| JP | 03007048 | A | * | 1/1991 |
| JP | 03143255 | A | * | 6/1991 |
| JP | 04168969 | A | * | 6/1992 |
| JP | 06-169559 | | | 6/1994 |
| JP | 2000-270531 | | | 9/2000 |

* cited by examiner

*Primary Examiner*—Burton Mullins
*Assistant Examiner*—Alex W Mok
(74) *Attorney, Agent, or Firm*—Rankin, Hill & Clark LLP

(57) ABSTRACT

Depressed portions for being fitted with two rotor collars 51, 52 are formed in two rotor stacks 72, 71 opposed to each other in an axial direction of the rotating shaft 1 with the rotor collars 51, 52 therebetween. Each of the rotor collars 51, 52 includes a central portion 5a and a pair of fitting portions 5b. Shapes of the depressed portions 8A and fitting portions 5b are both defined so that there occurs no relative displacement in the radial direction of the rotating shaft 1 between the rotor stacks 72, 71 and the rotor collars 51, 52 with the fitting portions 5b fitted into the depressed portions 8A. With this arrangement, position alignment of rotor collar and rotating shaft can easily be performed.

6 Claims, 4 Drawing Sheets

ROTOR FOR HYBRID TYPE STEPPING MOTOR AND MANUFACTURING METHOD THEREOF

BACKGROUND OF THE INVENTION

The present invention relates to a rotor for a hybrid type stepping motor and manufacturing method thereof.

Japanese Patent Application Laid-open Publication No. 270531/2000 shows a rotor for a hybrid type stepping motor, which comprises two stack assemblies and a rotor collar. The two stack assemblies each include a pair of rotor stacks having a plurality of small teeth arranged in a circumferential direction at their peripheral portions, and a permanent magnet which is held between the pair of the rotor stacks and is magnetized so that polarity of magnetic poles appearing at the small teeth of one of the paired rotor stacks may be different from that of magnetic poles appearing at the small teeth of the other rotor stack. Further, the two stack assemblies are mounted onto a rotating shaft so as to be arranged along the rotating shaft in an axial direction thereof. The rotor collar is made of a nonmagnetic material and is held between two adjacent stack assemblies so as to form a gap between the two adjacent stack assemblies. Then, the plurality of the small teeth at one of the paired rotor stacks are out alignment by ½ pitch with the plurality of those at the other rotor stack. The rotor collar is arranged inside depressed portions formed in the two rotor stacks opposed to each other in the axial direction of the rotating shaft with the the rotor collar disposed therebetween. Further, the plurality of the small teeth of one of two rotor stacks opposed to each other in the axial direction with the rotor collar disposed therebetween is also out of alignment by ½ pitch with those of the other rotor stack. In this rotor, the rotor stack is provided with a depressed portion that opens in the axial direction of the rotating shaft. Consequently, the rotor stack can be reduced in weight, thereby lessening the moment of inertia for the rotor.

Generally, in a rotor for a hybrid type stepping motor, a rotor assembly is constituted by combining a plurality of rotor stacks and one or more rotor collars by adjusting a plurality of small teeth in pitch misalignment. Then, the rotor assembly is press into a rotating shaft and fixed thereon. In the conventional rotor like this, however, when constituting the rotor assembly, position alignment of annular rotor collars and rotating shaft was impossible and it was therefore likely that both the axial centers of the both became out of alignment. Besides, there was such a trouble that a relative displacement in a radial direction of the rotating shaft occurred between the rotor stacks and the rotor collar. In the rotor like this, there is a possibility that it would become impossible to press the rotor assembly into the rotating shaft and the rotor collar would be unbalanced in weight in a circumferential direction of the rotating shaft.

SUMMARY OF THE INVENTION

Accordingly, it is an object of the present invention to provide a rotor for a hybrid type stepping motor in which position alignment of a rotor collar and a rotating shaft can be easily attained and relative displacement in a radial direction of the rotating shaft can be prevented from occurring between a rotor stack and a rotor collar.

It is another object of the present invention to provide a manufacturing method of a rotor for a hybrid type stepping motor, by which rotor collars can be easily manufactured.

A rotor for a hybrid type stepping motor, of which improvement the present invention aims at, comprises a plurality of stack assemblies and one or more rotor collars. The stack assemblies each include a pair of rotor stacks and a permanent magnet. Each rotor stack has a plurality of small teeth arranged in a circumferential direction at an outer peripheral portion thereof. The permanent magnet is held between the pair of rotor stacks (or paired rotor stacks) and magnetized so that polarity of magnetic poles appearing at the plurality of small teeth of one of the rotor stacks composing the pair of rotor stacks (one of the paired rotor stacks) may be different from polarity of magnetic poles appearing at the plurality of small teeth of the other rotor stack composing the pair of rotor stacks (the other of the paired rotor stack). The plurality of stack assemblies are mounted on a rotating shaft so as to be arranged along the rotating shaft in an axial direction thereof. One or more rotor collars are made of a nonmagnetic material. The rotor collar is arranged between two adjacent stack assemblies among the plurality of stack assemblies so as to form a gap between the two adjacent stack assemblies. In the present invention, two of the rotor stacks, opposing to each other in the axial direction with the rotor collar therebetween, respectively have a depressed portion for being fitted with the rotor collar. The depressed portion is formed so as to surround the rotating shaft and open toward the opposing rotor stack. The rotor collar includes a central portion extending in a radial direction of the rotating shaft, and a pair of fitting portions for fitting into the depressed portions of adjacent rotor stacks disposed at both sides of the central portion in the axial direction. A shape of the depressed portion of the rotor stack and a shape of the fitting portion are both defined so that no relative displacement in the radial direction of the rotating shaft may occur between the rotor stack and the rotor collar with the fitting portion fitted into the depressed portions of the adjacent rotor stacks. According to the present invention, there occurs no relative displacement in the radial direction of the rotating shaft between the rotor stack and the rotor collar with the fitting portions fitted into the depressed portions. The rotor collar can be fitted into the rotor stacks with the annular rotor collar aligned with the rotating shaft when constituting the rotor assemblies (by combining a plurality of rotor stacks and one or more rotor collars and permanent magnets). Consequently, the axial centers of both the rotor collar and rotating shaft can be prevented from becoming out of alignment with each other. Further, the relative displacement in the radial direction of the rotating shaft can be prevented from occurring between the rotor stacks and the rotor collar. As a result, the rotor assemblies can be pressed into the rotating shaft and further the rotor collar can be balanced in weight in a circumferential direction of the rotating shaft.

Preferably, a non-fitted depressed portion having the same shape as that of the depressed portion for being fitted with the rotor collar is formed in two rotor stacks which are disposed respectively at either axial end of the rotating shaft. With this arrangement, the rotor stack can be light in weight and the moment of inertia for the rotor can be reduced with a weight balance kept by each of non-fitted depressed portions in the axial direction of the rotating shaft.

Preferably, a cross-sectional outline of the depressed portion, as taken in a direction perpendicular to the rotating shaft, is a circle which is concentric with the rotating shaft and has the same diameter dimension with the rotating shaft. Also preferably, a cross-sectional outline of each of the fitting portions composing the pair of the paired fitting portions, as taken in a direction perpendicular to the rotating shaft, is a circle having almost the same diameter dimension as that of the depressed portion. Further preferably, the fitting portions are respectively formed with an annular depressed portion which are open in opposite directions to each other on the axial line of the rotating shaft and disposed concentrically with the rotating shaft. With this arrangement, the paired fitting portions of the rotor collar are each fitted into the depressed portions of two rotor stacks. Hence, the both can be firmly fitted with each other. Further, when pressing the rotor assemblies into the rotating shaft, end faces of the fitting portions abut onto the two rotor stacks, thereby preventing deformation of the rotor stacks.

The rotor collar may be made of a nonmagnetic metal material of different types. When the rotor collar is made of a die-cast molding of a nonmagnetic metal such as alminum, a shape like the annular depressed portion described above can be easily formed, thereby attaining simple manufacturing of rotor collars.

Preferably, a metal mold, which is used in manufacturing a rotor collar of a rotor for a hybrid type stepping motor according to the present invention, has at least one of a pouring gate and overflow gate at a portion thereof corresponding to a surface of the central portion of the rotor collar, exposed in the radial direction, and ejection pins to be pressed onto a surface of the rotor collar, exposed inside the annular depressed portion of the central portion of the rotor collar. The surface of the central portion of the rotor collar which is exposed in the radial direction, and the surface of the rotor collar which is exposed inside the annular depressed portion of the central portion of the rotor collar are not in contact with the rotor stacks when the rotor assemblies has been constituted. Therefore, even if a mark of the pouring gate or a mark pressed by the ejection pins is left on the surface of the rotor collar, there is no need of surface treatment. The surface of the central portion of the rotor collar which is exposed in the radial direction becomes the center of the axial direction of the rotor collar. Hence, if the pouring gate is formed in a portion corresponding to this exposed surface, a molten metal gets well into the entire rotor collar in a well-balanced manner, thereby increasing dimensional accuracy of the rotor collar.

According to the present invention, since there occurs no relative displacement in the radial direction of the rotating shaft between the rotor stack and rotor collar as the fitting portions of the rotor collar are fitted into the depressed portions of the rotor stacks, the rotor collar can be fitted with the rotor stacks with the rotor collar aligned with the rotating shaft, when constituting the rotor assemblies. Consequently, the axial centers of both the rotor collar and rotating shaft can be prevented from becoming out of alignment with each other. Further, the relative displacement in the radial direction of the rotating shaft can be prevented from occurring between the rotor stacks and rotor collars. As a result, the rotor assembly can be pressed into the rotating shaft, and the rotor collar can be balanced in weight in the circumferential direction of the rotating shaft.

BRIEF DESCRIPTION OF THE DRAWINGS

These and other objects and further features of the present invention will be apparent from the following detailed description when read in conjunction with the accompanying drawings.

DETAILED DESCRIPTION OF THE PREFERRED EMBODIMENT

Figure 1:
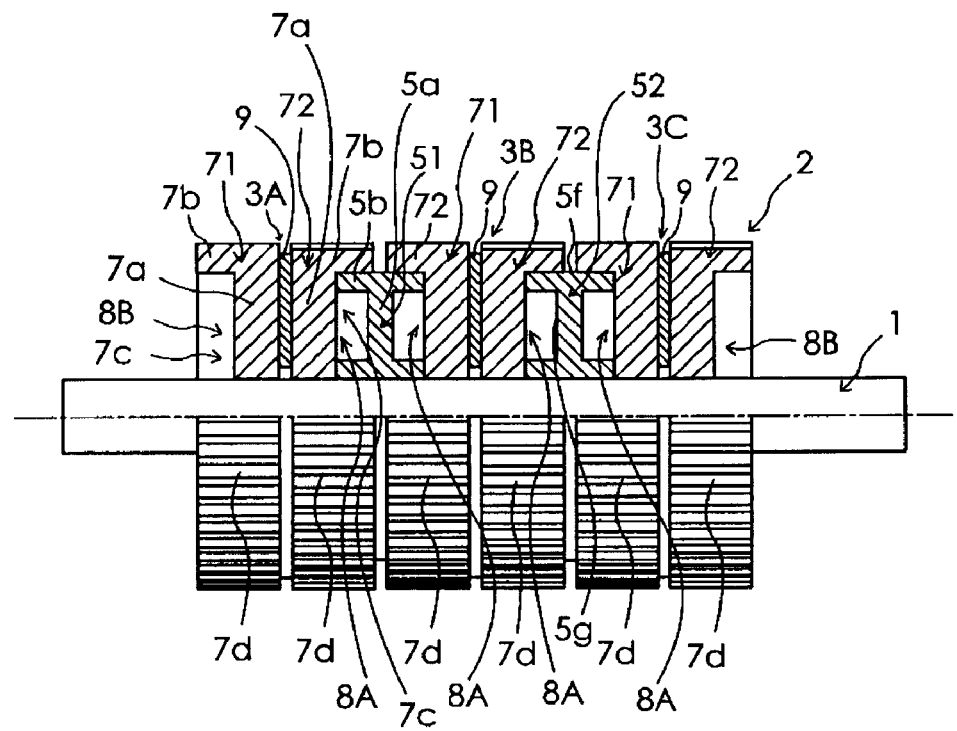
FIG. 1 is a partially broken-out plan view of one embodiment of a rotor for a hybrid type stepping motoraccording to the present invention.

Embodiments of the present invention will be described in detail with reference to the appended drawings. FIG. 1 is a partially broken-out plan view of one embodiment of a rotor for a hybrid type stepping motor according to the present invention. As shown in FIG. 1, the rotor for a hybrid type stepping motor of the present embodiment includes a rotating shaft 1 and a rotor assembly 2 fixed onto the rotating shaft 1 by press-fitting and using an adhesive agent. The rotor assembly 2 includes three stack assemblies 3A to 3C and two rotor collars 51, 52. Each of the stack assemblies 3A to 3C includes a pair of rotor stacks 71, 72 and a permanent magnet 9 held between the pair of the rotor stacks or paired rotor stacks 71, 72.

Figure 2:
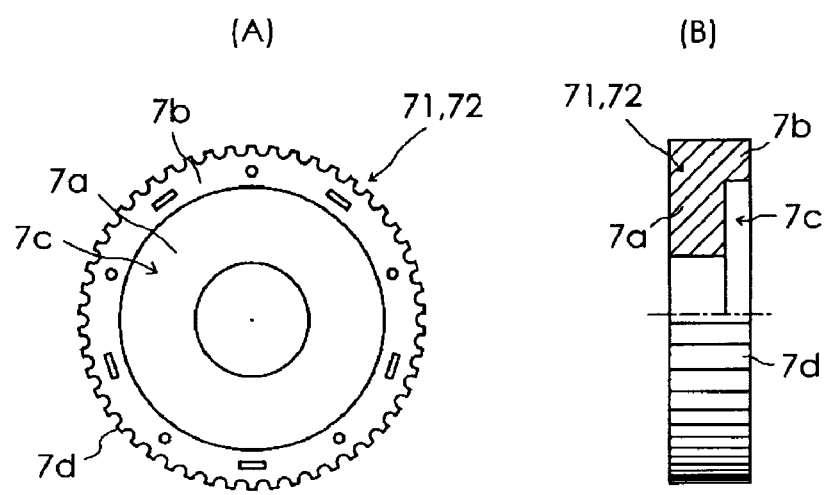
FIG. 2(A) is a front view of a rotor stack of the rotor for a hybrid type stepping motor shown in FIG. 1.
FIG. 2(B) is a partially broken-out plan view of the rotor stack of the rotor for a hybrid type stepping motor shown in FIG. 1.

The paired rotor stacks 71, 72 are different only in their mounting positions on the rotating shaft 1 from each other and both of the rotor stacks 71, 72 have the same shape. As shown in FIGS. 2(A) and 2(B), one of the rotor stacks (71, 72) includes an annular fixed portion 7a fixed onto the rotating shaft 1 and a tubular small teeth forming portion 7b which extending in an axial direction of the rotating shaft 1 and rising upward from a marginal portion of the fixed portion 7a. As a result, a depressed portion 7c is formed, being surrounded by the fixed portion 7a and the small teeth forming portion 7b. In an outer peripheral portion opposed to an armature, the small teeth forming portion 7b has a plurality of small teeth 7d that extend in the axial direction of the rotating shaft 1 and are arranged in a circumferential direction of the rotating shaft 1. With reference to FIG. 1, the depressed portion 7c of the rotor stack 71 and the depressed portion 7c of the rotor stack 72 are facing in opposite directions on the axial line of the rotating shaft 1 and the fixed portions 7a of the pair of the rotor stacks 71, 72 are arranged so as to face each other with the annular permanent magnet 9 adhered therebetween by an adhesive agent. A plurality of the small teeth 7d of one rotor stack 71 of the paired rotor stacks 71, 72 and a plurality of the small teeth 7d of the other rotor stack 72 are out of alignment with one another by half a pitch (½ pitch) of small teeth arrangement. Further, by means of the permanent magnet 9, polarity of magnetic poles appearing at the plurality of small teeth 7d of one rotor stack 71 is different from polarity of magnetic poles appearing at the plurality of small teeth 7d of the other rotor stack 72.

Further, three stack assemblies 3A to 3C are arranged in such a manner that two adjacent stack assemblies (3A, 3B) and (3B, 3C) are each disposed so that the depressed portions 7c are opposed to each other so as to form a gap between the small teeth forming portions 7b. In the present embodiment, four depressed portions 7c opposed to each other so as to be open toward the opposite rotor stack constitute depressed portions 8A for being fitted with the fitting portions of the rotor collar 51, 52. Two depressed portions 7*c* respectively disposed at either of axial ends of the rotating shaft constitute non-fitted depressed portions 8B. As described above, since all the pair of the rotor stacks 71, 72 have the same shapes, each of cross-sectional outlines, perpendicular to the rotating shaft 1, of the depressed portions 8A and non-fitted depressed portions 8B is a circle which is concentric with the rotating shaft 1 and has the same diameter dimension as that of the rotating shaft 1. Furthermore, the three stack assemblies 3A to 3C are arranged so that the plurality of the small teeth 7*d* of the two rotor stacks (71, 72), in two adjacent stack assemblies (3A, 3B), (3B, 3A), opposed to each other in the axial direction are out of alignment with one another by half the pitch (½ pitch) of the small teeth arrangement. Specifically, the plurality of the small teeth 7*d* of the rotor stack 7B of the rotor stack assembly 3A and the plurality of small teeth of the rotor stack 71 of the rotor stack assembly 3B are out of alignment with one another by half the pitch (½ pitch) of the small teeth arrangement. Further, the plurality of the small teeth 7*d* of the rotor stack 72 of the stack assembly 3B and that of small teeth 7*d* of the rotor stack 71 of the stack assembly 3C are also out of alignment with one another by half the pitch (½ pitch).

Figure 3:
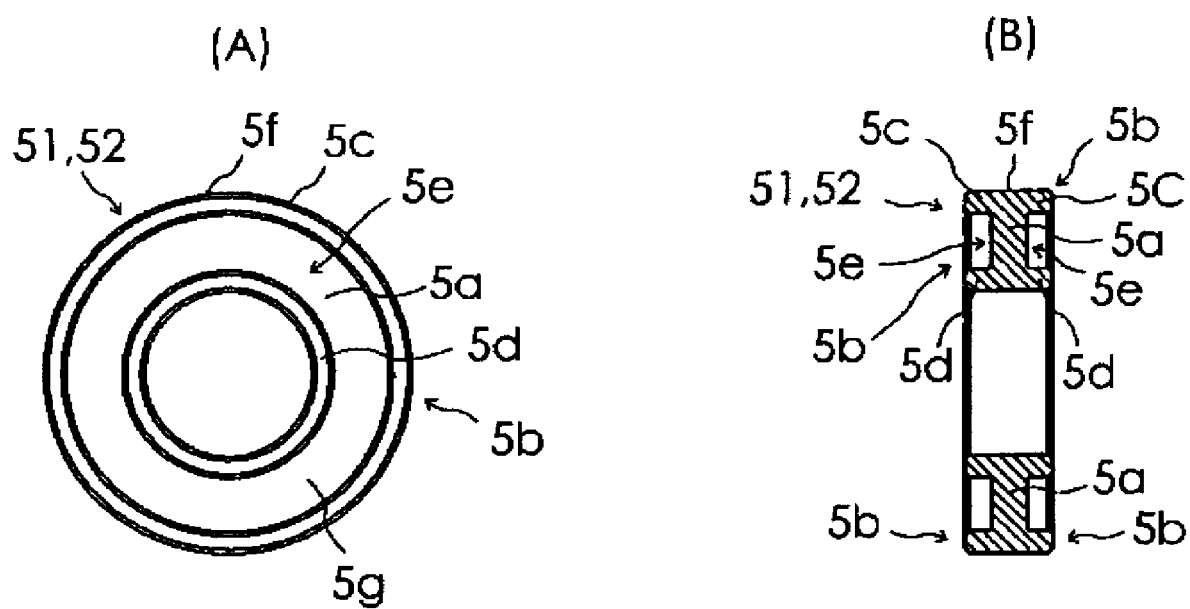
FIG. 3(A) is a front view of a rotor collar of the rotor for a hybrid type stepping motor shown in FIG. 1.
FIG. 3(B) is a partially broken-out plan view of the rotor collar of the rotor for a hybrid type stepping motor shown in FIG. 1.

The rotor collars 51, 52 are made of a nonmagnetic metal material such as aluminum or the like and are held between the two stack assemblies (3A, 3B), (3B, 3C) so as to form gaps between two adjacent stack assemblies (3A, 3B), (3B, 3C). As shown in FIGS. 3(A) and 3(B), one of the rotor collars (51, 52) includes a central portion 5*a* extending in a radial direction of the rotating shaft and a pair of the fitting portions 5*b* disposed at both sides of the central portion 5*a*. The central portion 5*a* has an annular shape surrounding the rotating shaft 1 with a slight gap formed therebetween. The pair of the fitting portions 5*b* are each provided with an outer tubular portion 5*c* and an inner tubular portion 5*d*. The outer tubular portion 5*c* of the pair of the fitting portions or paired fitting portions 5*b* has a cylindrical shape and abuts onto the fixed portion 7*a* and small teeth forming potion 7*b* of each of the rotor stacks 72, 71 opposed to each other in the axial direction. The inner tubular portion 5*d* also has a cylindrical shape and an end of the inner tubular portion 5*d* abuts onto the fixed portion 7*a* of each of the two rotor stacks 72, 71 and is arranged so as to surround the rotating shaft 1 with a slight gap formed therebetween. With this arrangement, between the outer and inner tubular portions 5*c*, 5*d* of the paired fitting portions 5*b*, an annular depressed portion 5*e* is formed which is opened outward in the axial direction and is arranged concentrically with the rotating shaft 1. A cross-sectional outline (an outline shape of the outer tubular portion 5*c*), perpendicular to the rotating shaft 1, of the pair of the fitting portions 5*b* has a circle which has approximately the same diameter dimension as that of the depressed portion 8A with the axial line of the rotating shaft 1 defined as the center. Consequently, the shapes of the depressed portions 8A and fitting portions 5*b* are defined so that there occurs no relative displacement in the radial direction of the rotating shaft 1 between the rotor stacks 71, 72 and one of the rotor collars (51, 52) with the fitting portion 5*b* fitted into the depressed portions 8A.

Figure 4:
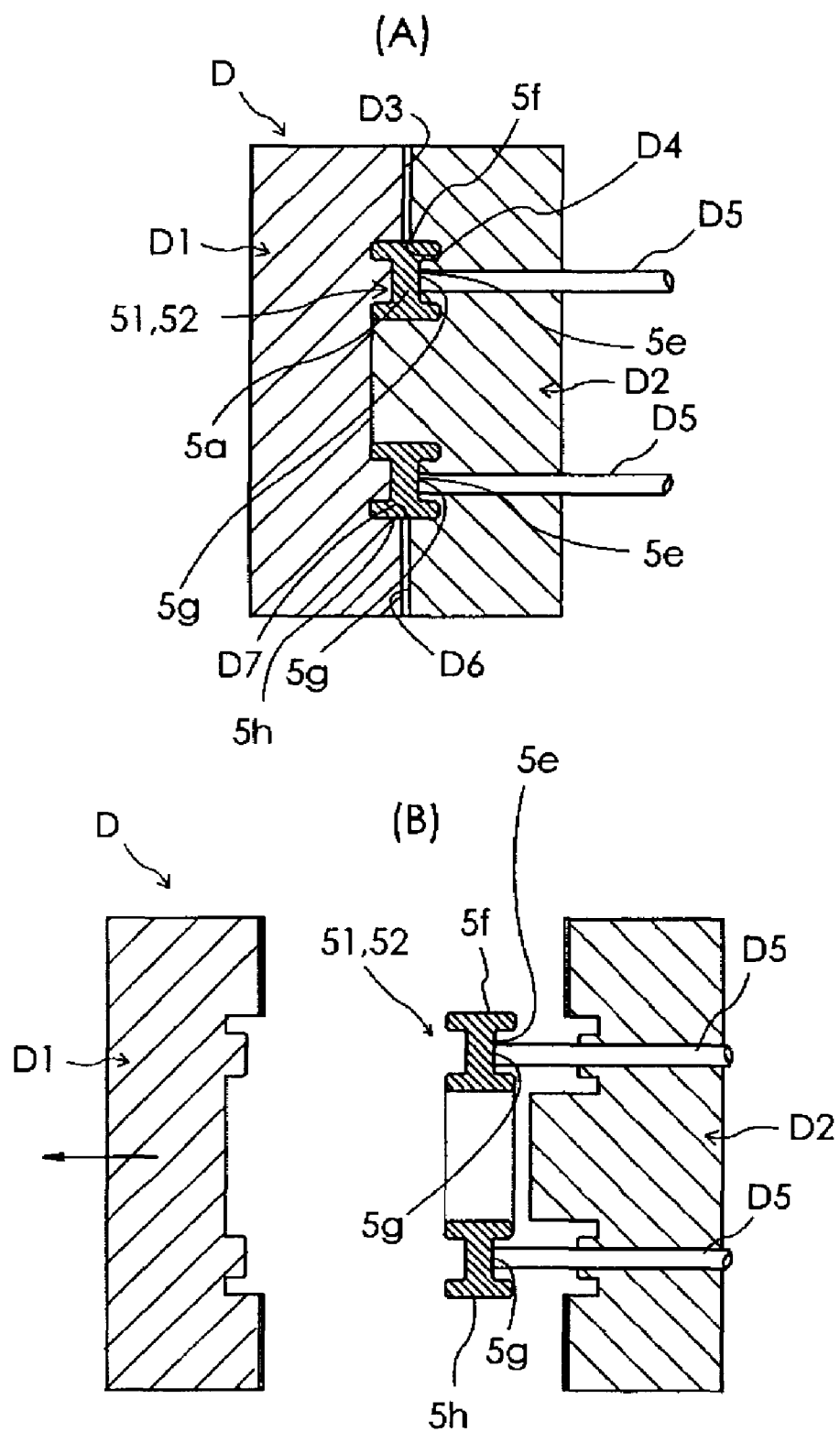
FIG. 4(A) is a view for explaining a manufacturing method of the rotor for a hybrid type stepping motor shown in FIG. 1.
FIG. 4(B) is also a view for explaining a manufacturing method of the rotor for a hybrid type stepping motor shown in FIG. 1.

In the present embodiment, the rotor collars 51, 52 are formed by die-cast molding using a metal mold D shown in FIGS. 4(A) and 4(B) wherein molten aluminum is pressed into the mold. This metal mold D comprises two halves, a first and a second metal mold half D1, D2. In the metal mold D, the first and second metal mold halves D1, D2 are combined together to form a runner channel D3 and an overflow passage D6. Further, a pouring gate D4 and an overflow gate D7 are respectively formed at ends, inside the metal mold, of the runner channel D3 and overflow passage D6 which are located at portions corresponding to surface portions 5*f*, 5*h*, exposed in the radial direction, of the central portions 5*a* of the rotor collars 51, 52 (portions exposed in the gaps between the small teeth forming portions 7*b* of two adjacent stack assemblies). Furthermore, the metal mold D is constructed so that ejection pins D5 (pins for ejecting out a molding from the metal mold), which are arranged inside the second metal mold half D2, may be pressed onto surface portions 5*g* exposed inside the annular depressed portions 5*e* of the central portions 5*a* of the rotor collars 51, 52. The surface portions 5*f*, 5*h* and 5*g* are never in contact with the rotor stacks 72, 71 (see the rotor collar 52 in FIG. 1). Consequently, the use of the metal mold like the one mentioned above can eliminate the need of surface treatment or the like even if a mark of the pouring gate or overflow gate, or a mark pressed by the ejection pins are left on the surfaces of the rotor collars.

In this embodiment, the rotor for a hybrid type stepping motor has been assembled as described below. First, with the adhesive agent applied to a junction of each of members, i.e., the rotor stack 71 of the stack assembly 3A, the permanent magnet 9 and the rotor stack 72, the rotor collar 51, the rotor stack 71 of the stack assembly 3B, the permanent magnet 9 and the rotor stack 72, the rotor collar 52, the rotor stack 71 of the stack assembly 3C, and the permanent magnet 9 and the rotor stack 72, they have been stacked within an assembly fixture. With this, the rotor assembly 2 is obtained in which the respective members have been adhered to each other, with the plurality of the small teeth 7*d* of the rotor stacks 71, 72 of each of the stack assemblies 3A to 3C being adjusted for pitch misalignment within the assembly fixture. Next, the rotor assembly 2 has been pressed into the rotating shaft 1 by using a pressing machine or the like. Thus, assembly has been completed.

According to the rotor for a hybrid type stepping motor of the present embodiment, there occurs no relative displacement in the radial direction of the rotating shaft 1 between the rotor stacks 71, 72 and one of the rotor collars (51, 52) with the fitting portions 5*b* fitted into the depressed portions 8A. Consequently, when assembling the rotor assembly 2, the rotor collars (51, 52) can be fitted into the two rotor stacks 72, 71 with the position alignment completed between the annular rotor collars (51, 52) and the rotating shaft 1. With this, the axial centers of both the rotor collars and rotating shaft 1 can be prevented from becoming out of alignment with each other. Further, relative displacement in the radial direction of the rotating shaft 1 can be prevented from occurring between the rotor stacks 72, 71 and one of the rotor collars (51, 52). As a result, the rotor assembly 2 can be pressed into the rotating shaft 1 and the rotor collars (51, 52) can be balanced in weight in the circumferential direction of the rotating shaft 1.

Figure 5:
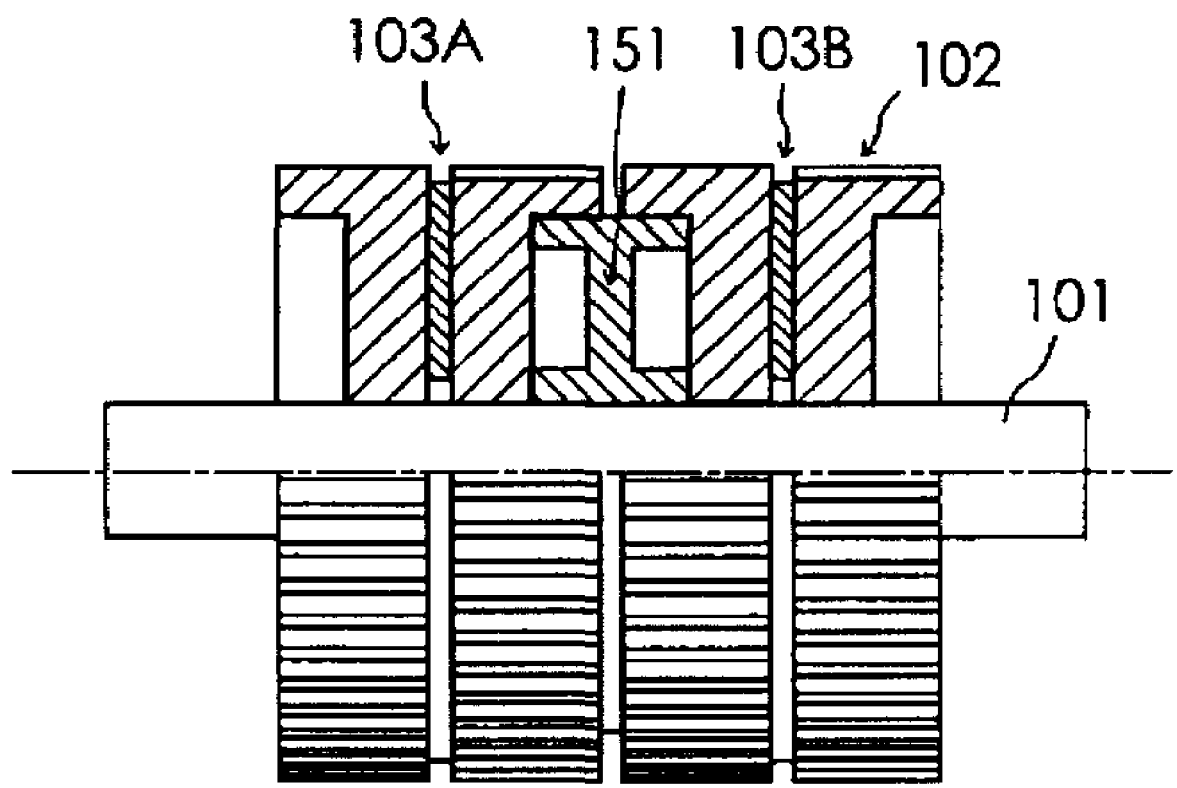
FIG. 5 is a partially broken-out plan view of another embodiment of a rotor for a hybrid type stepping motor according to the present invention.

In the embodiment described above, an example of the rotor for a hybrid type stepping motor is described that has three stack assemblies 3A to 3C and two rotor collars 51, 52. The number of stack assemblies and rotor collars, however, may be optionally determined. In another embodiment shown in FIG. 5, a rotor may be assembled using a rotating shaft 101 and a rotor assembly 102 which comprises two stack assemblies 103A, 103B and one rotor collar 151. This rotor has substantially the same construction as the one shown in FIG. 1 with the stack assembly 3C and the rotor collar 52 removed.

Further, the present invention is not limited to these embodiments, but various variations and modifications may be made without departing from the scope of the present invention.

What is claimed is:

1. A rotor for a hybrid type stepping motor comprising:

a plurality of stack assemblies each including a pair of rotor stacks, the rotor stack having a plurality of small teeth arranged in a circumferential direction at an outer peripheral portion thereof, and a permanent magnet held between the pair of rotor stacks and magnetized so that polarity of magnetic poles appearing at the plurality of small teeth of one of the rotor stacks composing the pair of rotor stacks may be different from polarity of magnetic poles appearing at the plurality of small teeth of the other rotor stack composing the pair of rotor stacks, the plurality of stack assemblies being mounted on a rotating shaft so as to be arranged along the rotating shaft in an axial direction thereof, and one or more rotor collars made of a nonmagnetic metal material, the rotor collar being arranged between two adjacent stack assemblies among the plurality of stack assemblies so as to form a gap between the two adjacent stack assemblies, wherein two of the rotor stacks, opposing to each other in the axial direction with the rotor collar therebetween, respectively have a depressed portion for being fitted with the rotor collar, the depressed portion being formed so as to surround the rotating shaft and open toward the opposing rotor stack;

wherein the rotor collars each include a central portion extending in a radial direction of the rotating shaft, and a pair of fifing portions for fitting into the depressed portions of adjacent rotor stacks disposed at both sides of the central portion in the axial direction;

wherein a shape of the depressed portion of the rotor stack and a shape of the fitting portion are both defined so that no relative displacement in the radial direction of the rotating shaft may occur between the rotor stack and the rotor collar with the fitting portion fitted into the depressed portions of the adjacent rotor stacks;

wherein a non-fitted depressed portion having the same shape as that of the depressed portion for being fitted with the rotor collar is formed in two rotor stacks among the rotor stacks, disposed respectively at either axial end of the rotating shaft; and wherein a cross-sectional outline of the depressed portion, as taken in a direction perpendicular to the rotating shaft, is a concentric circle with the rotating shaft; a cross-sectional outline of each of the fitting portions composing the pair of the paired fitting portions, as taken in a direction perpendicular to the rotating shaft, is a circle having almost the same diameter dimension as that of the depressed portion; and the fitting portions are respectively formed with an annular depressed portion, the annular depressed portions of the fitting portions being open in opposite directions to each other on the axial line of the rotating shaft and disposed concentrically with the rotating shaft.

2. The rotor for a hybrid type stepping motor according to claim 1, wherein the rotor collar is made of a die-cast molding of a nonmagnetic metal material.

3. The rotor for a hybrid type stepping motor according to claim 2, wherein the rotor collar is formed by a die-cast molding using a metal mold, the metal mold having at least one of a pouring gate and overflow gate at a portion thereof corresponding to a surface of the central portion of the rotor collar, exposed in the radial direction, and ejection pins to be pressed onto a surface of the rotor collar, exposed inside the annular depressed portion of the central portion of the rotor collar.

4. The rotor for a hybrid type stepping motor according to claim 1, wherein a cross-sectional outline of the depressed portion, as taken in a direction perpendicular to the rotating shaft, is a concentric circle with the rotating shaft; a cross-sectional outline of each of the fitting portions composing the pair of the paired fitting portions, as taken in a direction perpendicular to the rotating shaft, is a circle having almost the same diameter dimension as that of the depressed portion; and the fitting portions are respectively formed with an annular depressed portion, the annular depressed portions of the fitting portions being open in opposite directions to each other on the axial line of the rotating shaft and disposed concentrically with the rotating shaft.

5. The rotor for a hybrid type stepping motor according to claim 4, wherein the rotor collar is made of a die-cast molding of a nonmagnetic metal material.

6. A manufacturing method of a rotor for a hybrid type stepping motor, the rotor comprising:

a plurality of stack assemblies each including a pair of rotor stacks, the rotor stack having a plurality of small teeth arranged in a circumferential direction at an outer peripheral portion thereof, and a permanent magnet held between the pair of rotor stacks and magnetized so that polarity of magnetic poles appearing at the plurality of small teeth of one of the rotor stacks composing the pair of rotor stacks may be different from polarity of magnetic poles appearing at the plurality of small teeth of the other rotor stack composing the pair of rotor stacks, the plurality of stack assemblies being mounted on a rotating shaft so as to be arranged along the rotating shaft in an axial direction thereof, and one or more rotor collars made of a nonmagnetic material, the rotor collar being arranged between two adjacent stack assemblies among the plurality of stack assemblies so as to form gaps between the two adjacent stack assemblies, wherein two of the rotor stacks, opposing to each other in the axial direction with the rotor collar therebetween, respectively have a depressed portion for being fitted with the rotor collar, the depressed portion being formed so as to surround the rotating shaft and open toward the opposing rotor stack;

wherein the rotor collars each include a central portion extending in a radial direction of the rotating shaft, and a pair of fitting portions for fitting into the depressed depressed portions of adjacent rotor stacks disposed at both sides of the central portion in the axial direction;

wherein a shape of the depressed portion of the rotor stack and a shape of the fitting portion are both defined so that no relative displacement in the radial direction of the rotating shaft may occur between the rotor stack and the rotor collar with the fitting portion fitted into the depressed portions of the adjacent rotor stacks;

wherein a non-fitted depressed portion having the same shape as that of the depressed portion for being fitted with the rotor collar is formed in two rotor stacks among the rotor stacks, disposed respectively at either axial end of the rotating shaft;

wherein a cross-sectional outline of the depressed portion, as taken in a direction perpendicular to the rotating shaft, is a concentric circle with the rotating shaft; a cross-sectional outline of each of the fitting portions composing the pair of the paired fitting portions, as taken in a direction perpendicular to the rotating shaft, is a circle having almost the same diameter dimension as that of the depressed portion; and the fitting portions are respectively formed with an annular depressed portion, the annular depressed portions of the fitting portions being open in opposite directions to each other on the axial line of the rotating shaft and disposed concentrically with the rotating shaft; and wherein the rotor collar is made of a nonmagnetic metal material, the method employing a die-cast molding to form the rotor collar using a metal mold, the metal mold having at least one of a pouring gate and overflow gate at a portion thereof corresponding to a surface of the central portion of the rotor collar, exposed in the radial direction, and ejection pins to be pressed onto a surface of the rotor collar, exposed inside the annular depressed portion of the central portion of the rotor collar.

* * * * *